Nov. 12, 1968  E. C. ADAMS  3,410,134

FUEL METERING SYSTEM FOR VEHICLES

Filed Oct. 15, 1965

INVENTOR.
EARL C. ADAMS
BY Eugene M. Eckelman
ATTORNEY

United States Patent Office 3,410,134
Patented Nov. 12, 1968

3,410,134
FUEL METERING SYSTEM FOR VEHICLES
Earl C. Adams, Beaverton, Oreg., assignor to System's Corporation, Portland, Oreg., a corporation of Oregon
Filed Oct. 15, 1965, Ser. No. 496,521
2 Claims. (Cl. 73—113)

ABSTRACT OF THE DISCLOSURE

The invention includes fuel metering apparatus for connection to vehicles for the purpose of measuring fuel consumption which is not taxable. The apparatus includes a valve arranged to be connected in the fuel line of the vehicle and also arranged to direct fuel through an auxiliary metered fuel line when the vehicle is stopped. The valve is operated by a plunger in turn operated by the pressure or vacuum operated emergency brake and is arranged to be connected directly into communication with a connecting line of the air pressure or vacuum operated emergency brake so that when the emergency brake is set the fuel consumed by the vehicle engine will be measured.

---

This invention relates to a fuel metering system for vehicles.

As is well known, most states and the Federal government have provisions for refunding the fuels tax on gasoline and other fuels which are used in vehicles operated on private property or on other than local or Federal highways. While hauling vehicles, for example, consume a substantial quantity of gasoline which must be taxed they also consume substantial quantities of gasoline which are not taxable. Ready-mix concrete trucks are an example of hauling vehicles which consume great quantities of gasoline while parked. It is of course difficult to estimate the amount of gasoline used during the time the truck is off local or Federal roads and the various tax commissions involved are reluctant to accept the estimates given. It has been found however that the tax commissions will accept gallonage figures which are measured automatically by an accurate metering system operable during the time that the vehicle is parked with its emergency brake set, and it is accordingly a primary objective of the present invention to provide such a metering system which is placed in operation upon the fixing of the vehicle in a set position, as by operation of the emergency brake.

A more particular object is to provide a fuel metering system of the type described which utilizes valve means arranged to shunt fuel flow through a metering device upon the setting of emergency brake means of the vehicle.

Another object is to provide a fuel metering system of the type described one form of which is arranged to be controlled by existing compressed air or vacuum means on the vehicle, and also including other forms which have electrical and manual control means.

Briefly stated, the present system includes a valve mechanism which is installed in the existing fuel line of the vehicle and which is arranged to shunt the fuel through an auxiliary fuel line at selected times. The valve mechanism is operated by means in turn operated by emergency brake control means of the vehicle. The system is arranged such that when a vehicle is operating on the road and the emergency brake control means is released, the fuel will flow directly to the fuel mixing device of the engine, but upon setting of the emergency brake the valve shunts the flow of fuel through the auxiliary fuel line whereby fuel flowing to the mixing device will be metered.

The invention will be better understood and additional objects will become apparent from the following specification and claims, considered together with the accompanying drawings, wherein the numerals of reference indicate like parts and wherein.

Figure 1:
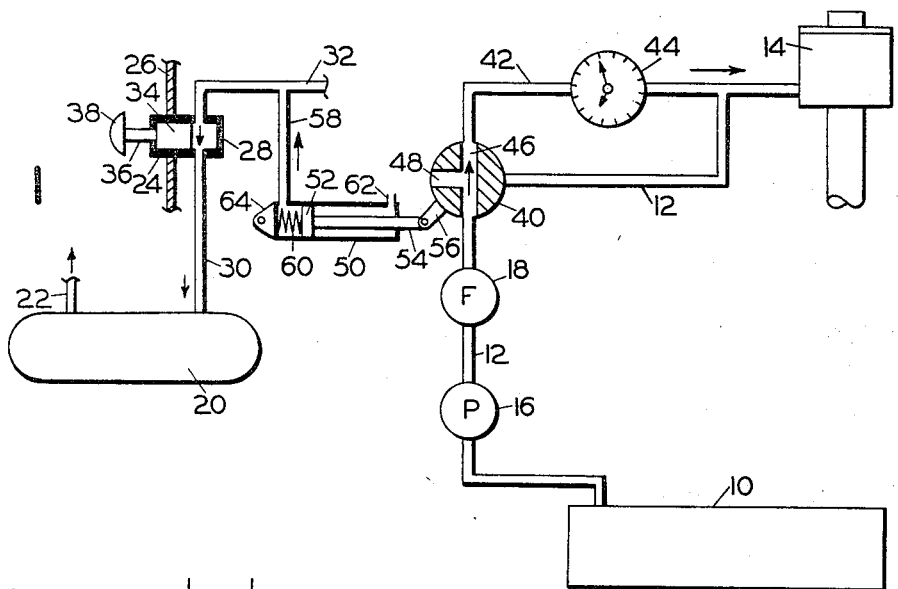
FIGURE 1 is a diagrammatic view of a first form of the present fuel metering system wherein the valve mechanism is operated by vacuum power means existing on the vehicle.

Referring first to FIGURE 1, hauling vehicles in conventional use employ a fuel tank 10, a fuel line 12 leading from the tank to a fuel mixing device 14 such as a carburetor, a fuel pump 16, and a filter 18. Of course, the fuel system on existing vehicles employs other mechanism but such mechanism is not directly related to the instant invention and is not illustrated.

For the purpose of exemplifying a first form of the invention, and referring again to FIGURE 1, many vehicles employ emergency brake control means operated by a vacuum system on the vehicle. Such vacuum system comprises a vacuum tank 20, a vacuum supply conduit 22 from a source of vacuum, and a control mechanism 24 mounted on the dashboard 26. The control mechanism 24 may comprise a chamber or housing 28 the interior of which is in communication with the vacuum tank 20 by means of a suitable conduit 30. The mechanism 24 has an outlet conduit 32 extending to conventional emergency brake setting means not shown. Slidably mounted in the chamber 28 is a manually operable plunger 34 to which is integrated a forwardly extending rod 36 projecting through the chamber 28 and terminating in a hand knob 38. The conduits 30 and 32 and the plunger 34 are dimensioned and arranged such that when said plunger is pushed rearwardly in the housing, vacuum is cut off from the chamber 28 and consequently the outlet conduit 32, but when the plunger is pulled forwardly to the position shown in FIGURE 1 vacuum is supplied to the conduit 32 and to the brake setting mechanism.

According to the present invention, a three-way valve 40 is installed in the fuel line 12 and has an auxiliary fuel line 42 leading therefrom and connected back into the fuel line. Incorporated in the auxiliary fuel line 42 is a meter 44 capable of metering gallonage flowing through the auxiliary fuel line. The three-way valve 40 is of conventional construction utilizing a diametral passageway 46 and a radial branch passageway 48, these passageways being arranged for permitting either the flow of fluid through the fuel line 12 or for shunting the flow of fuel through the auxiliary fuel line 42. More particularly, the valve 40 may comprise a rotatable type valve wherein in one position thereof the branch passageway 48 and a leg of the passageway 46 form a continuation of the fuel line while closing off the line 42 and in another position thereof, as shown in FIGURE 1, communication is established directly between the fuel line 12 and the auxiliary fuel line 42 while closing off the direct flow through said line 12.

As illustrated in FIGURE 1, the valve 40 is rotatably driven to a metering position by a vacuum operated cylinder 50 in which is incorporated a plunger 52 having a connecting rod 54 projecting rearwardly from the cylinder and connected to a suitable lever arm 56 on the valve 40. A conduit 58 is connected into the forward end of the cylinder 50 and is tapped into the outlet conduit 32 whereby when the plunger 34 of the emergency brake control mechanism is moved forwardly vacuum is supplied to the vacuum operated cylinder 50 and pulls the plunger 52 forwardly to rotate the valve 40 to a position wherein communication is established between the fuel line 12 and the auxiliary metered fuel line 42. A compression spring 60 is mounted in the cylinder between the forward end thereof and the plunger whereby to urge the plunger rearwardly upon the release of vacuum in the system and to return the valve 40 to its fuel supplying position for the flow of fuel through the fuel line 12 only. The cylinder 50 has a suitable exhaust outlet 62 and suitable mounting lugs 64 or the like for pivoted attachment to the vehicle.

Thus, in the road operation of the vehicle the plunger 34 will be located in its rearward position in the chamber 28 to close off inlet conduit 30. In this position of the plunger 34 the vacuum cylinder 50 is inoperative, as is the emergency brake applying means, the spring 60 in such operative position forcing the plunging 52 rearwardly and causing communication of passageway 48 and one leg of passageway 46 for direct flow of fuel through the fuel line 12. To set the emergency brake on the vehicle, the operator moves the plunger 34 forwardly which of course sets the emergency brake and causes a vacuum condition to exist in conduit 58 and the cylinder 50. This causes movement of plunger 52 to the FIGURE 1 position to effect a metered flow. Thus, any gasoline usage in a set position of the vehicle, which comprises an off road position, is measured. Upon release of the emergency brake non-metered flow resumes.

It is understood that the system of FIGURE 1 may be utilized with compressed air or other fluid media, rather than vacuum, with a minor alteration of the parts.

Figure 2:
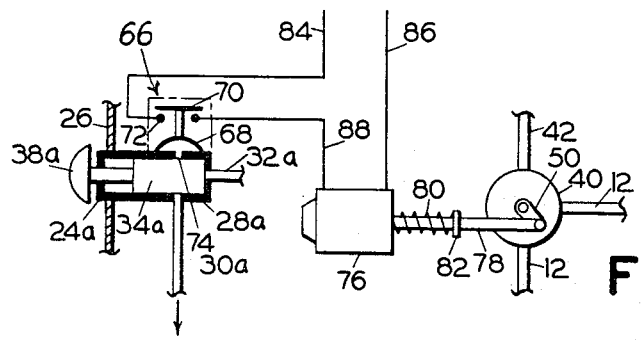
FIGURE 2 is a fragmentary, diagrammatic view showing electrical operating means for the metering system.

FIGURE 2 illustrates another form of the invention wherein the operating means for the valve 40 is electrical. In this embodiment the control mechanism 24a similarly has a chamber or housing 28a provided with an inlet conduit 30a for vacuum or compressed air and an outlet conduit 32a leading to brake operating mechanism. Chamber 28a has a plunger 34a which is operative as in FIGURE 1 to control the existence of vacuum or air pressure in said chamber.

In the embodiment of FIGURE 2, the operating and control means for the valve 40 comprises a switch 66 including a diaphragm 68 connected to a switch contact arm 70. The contact arm 70 is associated with switch contacts 72 for opening and closing positions of the switch. Diaphragm 68 is associated with a port 74 in the chamber 28a and is arranged such that when the plunger 34a is moved forwardly the vacuum in the system operates the diaphragm 68 to close the switch arm 70 on the contacts 72.

Switch 66 controls the operation of a solenoid 76 the plunger of which has a rod extension 78 pivotally connected to the lever arm 56 of the valve. The plunger of solenoid 76 has a spring return effected by a compression spring 80 mounted on the rod extension 78 and confined between the plunger and a backing arm 82 suitably secured to the vehicle.

The electrical system includes a pair of feed lines 84 and 86, the feed line 84 leading to one of the contacts 72 and the other feed line 86 leading to one side of the solenoid 76, the series circuit being completed by a line 88 connected between the other contact of the switch and the other side of solenoid 76.

The operator sets the emergency brake by pulling outwardly on the knob 38a whereby the plunger 34a uncovers inlet conduit 30a. Such movement of the plunger opens the system to the outlet conduit 32a to set the emergency brake and also allows the vacuum condition to draw in the diaphragm 68 to close the switch arm 70 on the contacts 72. Closing of the switch energizes the solenoid 76 which rotates the valve 40 in a clockwise direction to establish communication between the fuel line 12 and the auxiliary fuel line 42. FIGURE 2 illustrates the control mechanism 24a in a position wherein the emergency brake is released for highway travel.

Figure 3:
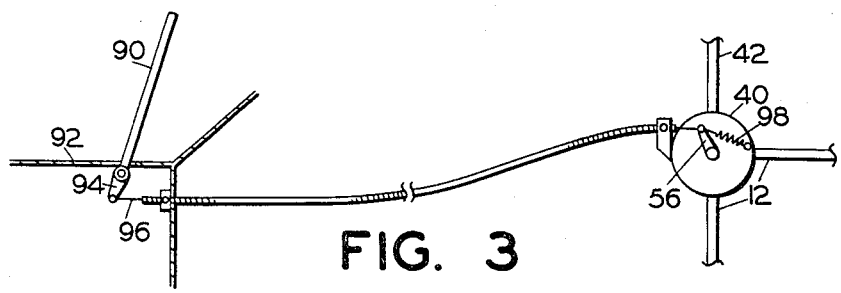
FIGURE 3 is a fragmentary, diagrammatic view showing manually operable means for operating the metering system.

FIGURE 3 illustrates manually operable control means for the valve 40 and is designed particularly for those vehicles which employ a hand brake lever 90. These brake levers are usually pivotally mounted in the driver's compartment 92, and for the purpose of the present invention have connection, as by means of a lever extension 94, with a flexible cable 96. Cable 96 is secured to the lever arm 56 of the valve 40, and the parts are arranged such that when the hand lever 90 is pulled back to set the emergency brake the valve 40 is simultaneously rotated to establish communication between the fuel line 12 and the auxiliary metering fuel line 42. Spring return of the cable 96 and the rotating valve part is accomplished by a tension spring 98 connected between the lever arm 56 and an anchor point such as the housing for the valve.

In accordance with the present invention, the fuel used in the operation of the vehicle when its emergency brake is set, is accurately metered.

It is to be understood that the form of my invention herein shown and described is to be taken as a preferred example of the same and that various changes in the shape, size and arrangement of parts may be resorted to without departing from the spirit of my invention or the scope of the subjoined claims. For example, the valve 40 may be of any suitable construction as long as it is capable of shunting the flow of the fuel through the meter and being capable of pressure operation as described.

Having thus described my invention, I claim:

1. A fuel measuring system for vehicles adapted for metering fuel consumed by said vehicle only when the emergency brake of said vehicle is in a braking position, the vehicle being of the type having fuel feed means and the emergency brake operated by pressured air and also having pressure supply means connected to the brake by connecting lines, said vehicle further having manual control means between the pressure supply and the emergency brake for releasing and setting the emergency brake, said fuel measuring system comprising
    (a) auxiliary fuel feed means,
    (b) a meter in said auxiliary fuel feed means for measuring the quantity of fuel flow therethrough,
    (c) a valve connected to said auxiliary fuel feed means and arranged for installation in the fuel feed means of the vehicle,
    (d) said valve having a first position for directing fuel through the fuel feed means and a second position for directing fuel through said auxiliary fuel feed means,
    (e) and air pressure operated means for moving said valve to the spaced position,
    (f) said air pressure operated means connected directly into the connecting lines of the air pressure operated vehicle emergency brake for communication therewith, whereby said air pressure operated means move said valve to its second position when the emergency brake of the vehicle is set to a braking position to thence direct the flow of fuel used by the vehicle only through the auxiliary fuel feed means.

2. A fuel measuring system for vehicles adapted for metering fuel consumed by said vehicle only when the emergency brake of said vehicle is in brake position, the vehicle being of the type having fuel feed means and the emergency brake operated by vacuum and also having vacuum supply means connected to the brake by connecting lines, said vehicle further having manual control means between the vacuum supply and the emergency brake for releasing and setting the emergency brake, said fuel measuring system comprising
    (a) auxiliary fuel feed means,
    (b) a meter in said auxiliary fuel feed means for measuring the quantity of fuel flow therethrough,
    (c) a valve connected to said auxiliary fuel feed means and arranged for installation in the fuel feed means of the vehicle, (d) said valve having a first position for directing fuel through the fuel feed means and a second position for directing fuel through said auxiliary fuel feed means, (e) and vacuum operated means for moving said valve to its second position, (f) said vacuum operated means being arranged to be connected directly into the connecting lines of the vacuum operated vehicle emergency brake for communication therewith, whereby said vacuum operated means is arranged to move said valve to its second position when the emergency brake of the vehicle is set to a braking position to thence direct the flow of fuel used by the vehicle only through the auxiliary fuel feed means.

References Cited

UNITED STATES PATENTS 2,866,331  12/1958  Michie _____ 73—113
3,252,322  5/1966  Pring _____ 73—113

RICHARD C. QUEISSER, *Primary Examiner.*

E. D. GILHOOLY, *Assistant Examiner.*